(12) United States Patent
Petersen (10) Patent No.: US 8,089,863 B2
(45) Date of Patent: Jan. 3, 2012

(54) RF SITE RESILIENCE USING MULTIPLE VISITOR LOCATION REGISTERS SIMULTANEOUSLY

(75) Inventor: Steen Petersen, Frederiksberg (DK)

(73) Assignee: Motorola Solutions, Inc., Schaumburg, IL (US)

( * ) Notice: Subject to any disclaimer, the term of this patent is extended or adjusted under 35 U.S.C. 154(b) by 181 days.

(21) Appl. No.: 12/510,357

(22) Filed: Jul. 28, 2009

(65) Prior Publication Data

US 2011/0026393 A1 Feb. 3, 2011

(51) Int. Cl.
*G01R 31/08* (2006.01)

(52) U.S. Cl. .................................. 370/217; 370/328

(58) Field of Classification Search .............. 370/216, 370/217, 218, 219, 220, 221, 225, 228, 328, 370/338, 389, 392
See application file for complete search history.

(56) References Cited

U.S. PATENT DOCUMENTS

| | | | | |
|---|---|---|---|---|
| 6,148,410 A * | 11/2000 | Baskey et al. | ................. | 714/4.11 |
| 6,222,821 B1 * | 4/2001 | Sees et al. | ..................... | 370/227 |
| 6,725,274 B1 * | 4/2004 | Slik | .............................. | 709/231 |
| 6,873,618 B1 * | 3/2005 | Weaver | ........................ | 370/390 |
| 7,068,624 B1 * | 6/2006 | Dantu et al. | .................. | 370/331 |
| 7,139,926 B1 * | 11/2006 | Madhav et al. | .............. | 714/4.11 |
| 7,529,180 B1 * | 5/2009 | Karl et al. | ..................... | 370/216 |
| 2008/0052344 A1 * | 2/2008 | Alecci et al. | .................. | 709/203 |
| 2009/0209252 A1 * | 8/2009 | Han et al. | ...................... | 455/433 |

FOREIGN PATENT DOCUMENTS

GB 2395629 A 5/2004

OTHER PUBLICATIONS

Chen, et al. Fault Tolerance of PCS Mobilit Databases; Sep. 22-25, 1997, pp. 542-547 http://ieeexplore.ieee.org/iel3/4912/13564/00623365.pdf?arnumber=623365.

* cited by examiner

*Primary Examiner* — Ricky Ngo
*Assistant Examiner* — Christine Ng
(74) *Attorney, Agent, or Firm* — Anthony P. Curtis; Daniel R. Bestor (57) ABSTRACT

A method and system are presented in which communication redundancy is provided. Multicast packets having the same audio and/or control data are simultaneously transmitted between an RF site and different switches through different communication links. The packets from the RF site have different origination addresses and a unique ID, which permits duplicate packets having different origination addresses but the same unique ID and data to be eliminated and only one set of packets to be transmitted over the air to a receiving end device for which the packets are intended. A switch communication link between the switches permits the primary switch to establish operating characteristics for the alternate switch.

20 Claims, 4 Drawing Sheets

RF SITE RESILIENCE USING MULTIPLE VISITOR LOCATION REGISTERS SIMULTANEOUSLY

TECHNICAL FIELD

The present invention relates to communication systems, and in particular to a method and system for improving the resilience of an RF site by using multiple visitor location registers to simultaneously service the RF site.

BACKGROUND

Wireless communication systems, for example cellular telephony or private mobile radio communication systems, typically provide for communication links to be arranged between mobile end devices. The end devices may be able to communicate through different types of communications, depending on the standard(s) supported by the end devices and network. For example, push-to-talk (PTT) end devices support communication types that include indirect communication, in which a system infrastructure having fixed installations including base transceiver stations (base stations, or as referred to herein, RF sites) and a call control computer/server (also known as a communication or network switch or a mobile switching center) are employed or direct communication between the end devices, in which the system infrastructure is not used.

A variety of modes may be available in each of these communications types. These modes include conventional over-the-air (OTA) device-to-device communication or trunked communication. In trunked communication, a (talk) group call is initially established using a group address to which members of the talkgroup subscribe and then audio is transmitted from the transmitting end device to all receiving end devices that are members of the talkgroup by use of transmitting to the group address.

In a digital trunked radio system, there are a number of scenarios which result in service outages. In non-redundant configurations, if one of the base stations or the call control computer fails or if a communication link between one of the base stations and the switch fails, the resulting catastrophic breakdown terminates communications between the transmitter and one or more of the receivers until either the base station or switch is repaired or the link problems clear up. If a redundant configuration is used in which a second switch is used as a standby switch, communication is stopped for the period it takes to re-route the communication (losing any audio data, which is generally not retransmitted if not received) or re-establish the control communication (as control data is generally retransmitted if not received).

Outages can range from several seconds to hours or more. While such problems may be somewhat inconvenient for most users and applications, there exist situations in which even a relatively short loss of data or delay is unacceptable. One such situation is Mission Critical applications, such as public safety operations at incidents, in which consistent reliability in communications is imperative through severe environmental and operations stresses. It is thus desirable to provide a communication system in which loss of control and other data due to infrastructure device or link failure is eliminated.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the various embodiments, it should be observed that the embodiments reside primarily in combinations of method steps and apparatus components related to provide resilience for unicast or multicast communications. Accordingly, the apparatus components and method steps have been represented where appropriate by conventional symbols in the drawings, showing only those specific details that are pertinent to understanding the various embodiments, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that the embodiments described herein may be comprised of one or more conventional processors and unique stored program instructions that control the one or more processors to implement, in conjunction with certain non-processor circuits, some, most, or all of the functions of providing communication redundancy as described herein. The non-processor circuits may include, but are not limited to, a radio receiver, a radio transmitter, signal drivers, clock circuits, power source circuits, and user input devices. As such, these functions may be interpreted as steps of a method for providing communication redundancy. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
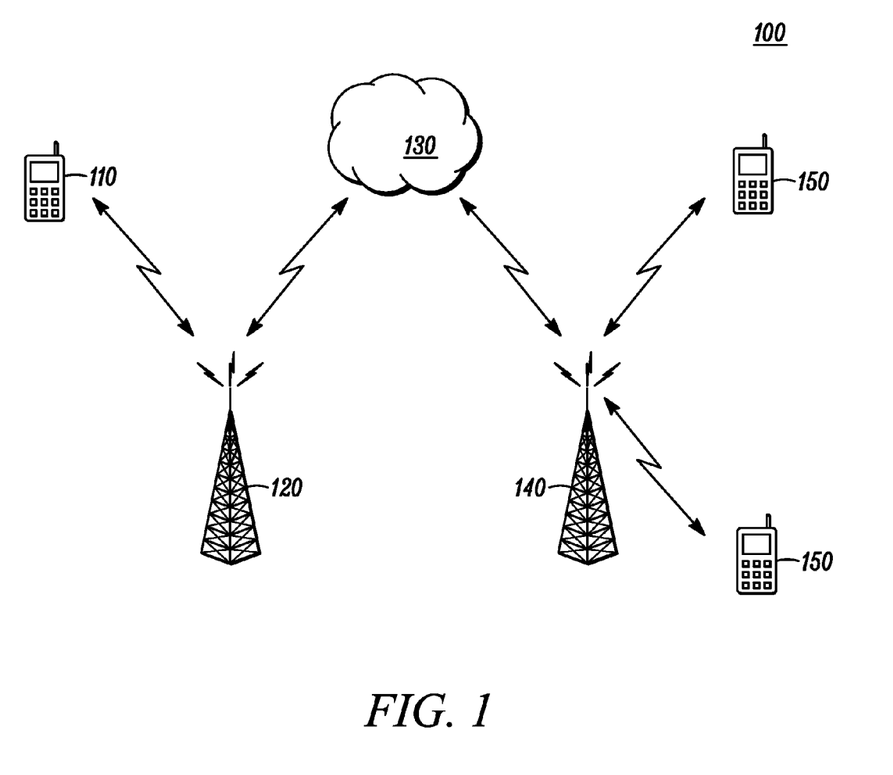
FIG. 1 is an embodiment of a communication system.

The embodiments are directed to communication networks that provide communication redundancy. A block diagram of one embodiment of a communication system 100 is illustrated in FIG. 1. As shown, one end device (transmitter) 110 sends data to other end devices (receivers) 150 through infrastructure 130. Note that although transmitting and receiving radio frequency (RF) sites (base stations) 120, 140 are shown as being separate from infrastructure 130 for convenience, they are considered part of the infrastructure 130. The infrastructure 130 contains switches, consoles that patch communications, and other communication devices that permit communications to occur and whose general operation is known.

The switch is responsible for handling audio packets (i.e. audio information in a digital form) as well as other data, setting up and releasing the end-to-end connection and handling mobility and hand-over requirements during a call. The switch thus establishes the call as well as maintaining call control. The switch is associated with a Visitor Location Register (VLR), a temporary database that stores information about all the end devices that are currently served by the associated switch. This information includes, for example, the current Location Area Identity, which identifies under which Base Station Controller the end device is currently present. Whenever a switch detects a new end device in its network, in addition to creating a new record in the VLR, it also updates a home location register (HLR) of the end device to indicate the present location of the end device. The HLR is a permanent, central database that contains details (e.g., unique identifiers, telephone numbers, services provided) of the end devices authorized to use the network. As defined herein, a database is an electronic memory that may additionally contain one or more processors, e.g., to operate on the data stored therein. In addition, the terms VLR and switch are used synonymously herein, although they may be separate physical and/or logical entities.

Figure 2:
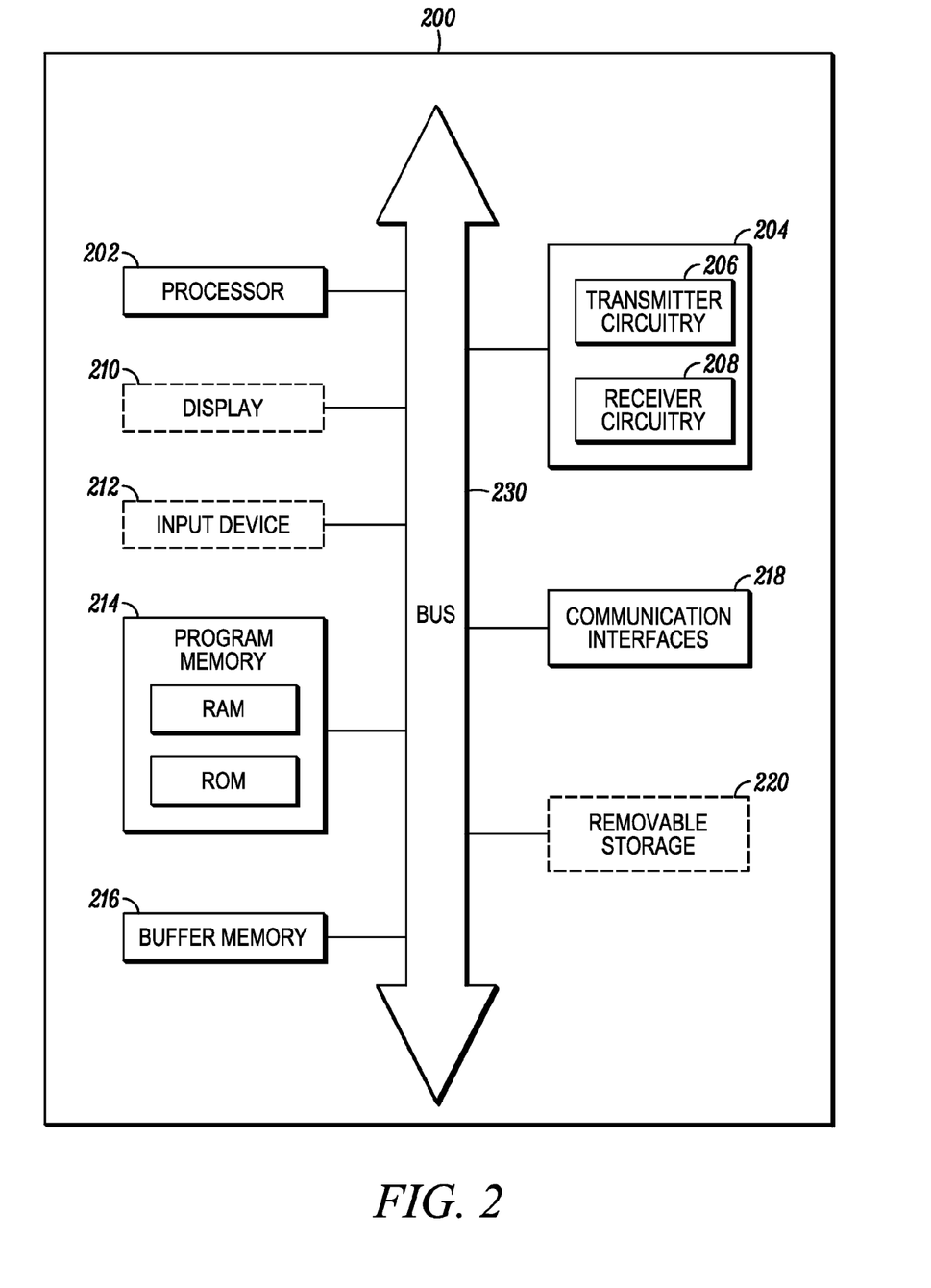
FIG. 2 is an embodiment of a block diagram of an exemplary device in the system of FIG. 1.

Referring to FIG. 2, a block diagram of an exemplary device 200, such as a base station or switch, is illustrated. The device 200 is typically a server or other computing device configured and operated locally or remotely by an operator or operated automatically. The device 200 contains, among other components, a processor 202, a transceiver 204 including transmitter circuitry 206 and receiver circuitry 208, a program memory 214 for storing operating instructions that are executed by the processor 202, a buffer memory 216, one or more communication interfaces 218, and optionally (as shown by the dashed boxes) a display 210, an input device(s) 212, and a removable storage 220.

The device 200 may also contain other elements necessary for the device 200 to provide its particular electronic functionality, all connected by a bus 230. Alternatively, the device 200 may comprise a collection of appropriately interconnected units or devices, in which such units or devices perform functions that are equivalent to the functions performed by the elements of the device 200.

The processor 202 is used for a variety of functions and may include one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) and/or read only memory (ROM), a hard disk drive, a compact disk (CD) ROM, a digital video disk (DVD), a high density (HD) disk, a flash memory card or any other medium for storing digital information. One of ordinary skill in the art will recognize that when the processor 202 has one or more of its functions performed by a state machine and/or logic circuitry, the memory 214 containing the corresponding operational instructions.

The buffer memory 216 may be any form of volatile memory, such as RAM, and is used for temporarily storing received information packets. The display 210 may be an LCD, CRT, or any other known display. The input device 212 may be used by the operator local to the device 200 to operate the device 200 and may be one or more of: an alpha-numeric keyboard, isolated buttons, soft and/or hard keys, touch screen, jog wheel, or any other known input device. The device 200 also includes one or more communication interfaces 218 that include conventional circuitry to enable digital transmissions over a communication channel using, for example IP/Ethernet LANs.

Figure 3:
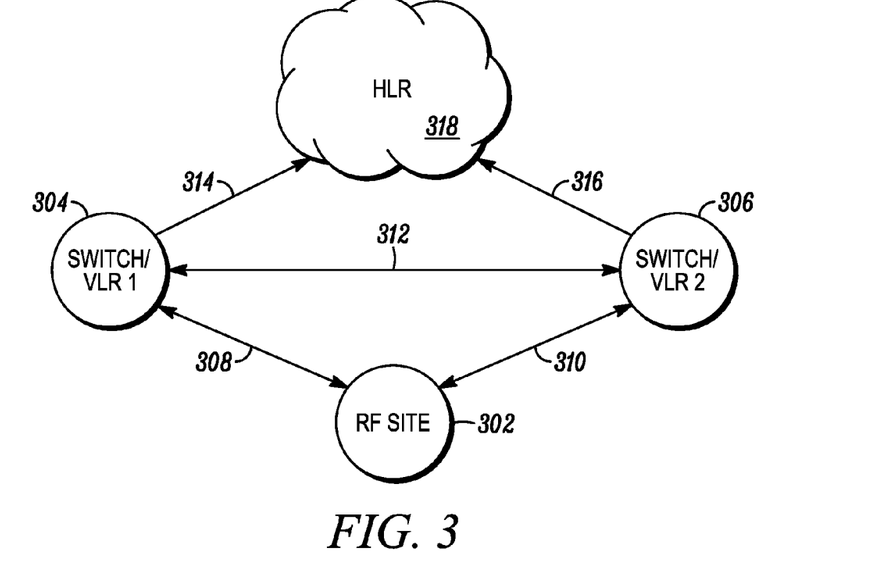
FIG. 3 is an embodiment of data passing between devices in the system of FIG. 1.

Turning to FIG. 3, data passing through the infrastructure is shown. RF site 302 associated with the transmitter (end device) is connected to multiple switches 304, 306 over links 308, 310. As previously defined herein, an RF site is a base station, a switch is a call control computer/server in the network, and a link is a wireless (of any frequency) or wired (electrical or optical) connection between various elements. Although only two switches are shown in FIG. 3 for convenience, more may be present. Unlike conventional networks in which different switches in different geographical locations cover end devices also in different geographical locations, switches 304, 306 in different geographical locations cover end devices in the same geographical location (switches 304, 306 may or may not be local to the end devices). This is to say that in typical conventional networks, each RF site in the communication system is served by exactly one switch at a particular point in time.

In other conventional communication systems in which two switches service the same geographical locations, only one switch has been active at a time (the other being inactive). This prevents several problems such as those associated with control issues, e.g., channel allocation (if two switches are active, they may designate the same channel simultaneously for different calls or different channels for the same call). Moreover, in such systems if the active switch becomes non-operational, the inactive switch is activated and any outage lasts only seconds to minutes—the time it takes to switch over to the previously inactive switch. However, for Mission Critical or other applications, this may still be insufficient as audio packets transmitted during a call is lost (as they are not retransmitted) and it takes an extended period of time to set up a call (as control signals are retransmitted).

In the arrangement of FIG. 3, switches 304, 306 are both active and serve the same geographical location and thus RF site 302 to provide redundant service to RF site 302. The switches 304, 306 may serve a single RF site or multiple RF sites. Both switches 304, 306 receive multicast audio and control packets from RF site 302 over links 308, 310 and these multicast packets are simultaneously processed at each switch 304, 306 and routed through the infrastructure to eventually reach the receivers. Note that each of control packets used, e.g., during call setup, as well as audio packets are duplicated and simultaneously sent to and processed by each switch 304, 306. However, switches 304, 306 filter packets from RF site 302. RF site 302 transmits two sets of packets over links 308, 310 containing the same audio/control data but using different source (origination) addresses as well as a unique ID. Both sets of packets (i.e., packets with duplicated audio/control data) transmitted from RF site 302 over links 308, 310 are received and then filtered by the switches 304, 306 so that only one set of packets is accepted by each switch 304, 306.

Information of the end device, as well as other desired information, is provided by both switches 304, 306 to the HLR 318 over links 314, 316. As shown, HLR 318 is separate from switches 304, 306. In one embodiment, for full resilience HLR 318 is highly available and geographically redundant. As HLRs and the method by which HLRs are made highly available are known by one of skill in the art, this will not be further described herein. The data of the end device that is stored in the switch 302, 304 is received from the HLR 318 or collected from the end device. This data includes the identity and phone numbers of the end device, any authentication data for the end device to communicate with the network, services that the end device is allowed to access, the RF site and access point served, and the HLR address of the end device.

To conserve bandwidth, once the receiving RF site (not shown) associated with the receiver(s) receives the different sets of packets from the infrastructure, the receiving RF site examines the packets for the multicast IP address as well as content and discards duplicates packets before transmitting them over the air to the receiver. The receiving RF site, like RF site 302, contains one or more processors, memory, and other circuitry that enable their desired functionality. Alternatively, multicast routers located elsewhere within the infrastructure (but separate from the receiving RF site) may eliminate the duplicate packets. Algorithms to discard duplicate packets are well known in the art and thus for brevity will not be provided here.

In addition, as shown in FIG. 3, switches 304, 306 communicate with each other over link 312. Information exchange between switches 304, 306 may occur at predetermined intervals (e.g., every second or several seconds) and/or at predetermined events such as when data is received from RF site 302. This permits switches 304, 306 to determine whether the other VLR or either of links 308, 310 become non-operational. If no response/packet is received at one of the switches (say, switch 304) from the other switch 306, then the first switch 304 determines that either the other switch 306 or the link 312 is non-operational. If a response is received at the first switch 304 from the other switch 306, then information may be provided in the response to the first switch 304 from the other switch 306 on whether the link 308, 310 between the RF site 302 and the other switch 306 is operational or not. By making this determination, responses can be sent by the first switch 304 to the RF site 302 without waiting for information from the other switch 306, if needed.

As described, one of the switches 304, 306 (the primary VLR) may act as a "master" and the other of the switches 304, 306 (the alternate VLR) act as a "slave" in initiating communication between the switches 304, 306. The primary VLR determines the operational characteristics of the call, e.g., the channel assignment and multicast group, controls synchronization of the information transmitted between the two devices, and informs the alternate switch as to the operational characteristics to provide for the call. Once one of the switches 304, 306 detects that a failure exists in the other route (i.e., other link 308, 310 or other switch 304, 306), that switch 304, 306 becomes the primary switch if it was previously the alternate switch and the other switch 304, 306 was formerly the primary switch.) The primary/alternate designation may be done for a single RF site, a sub-set of RF sites or all RF sites served by the switches 304, 306.

Registration of the end device when it enters the geographic location served by RF site 302 may be achieved by a number of different methods. In one such embodiment, the end device first registers at RF site 302. RF site 302 sends the identity of the end device, along with other desired information to each of switches 304, 306. RF site 302 may send an indication to one of Switches 304, 306 that that switch is the primary switch and/or may send an indication to the other of switches 304, 306 that that switch is the alternate switch. Alternatively, RF site 302 may merely transmit the control or audio packets without any such indication and switches 304, 306 may indicate on their own which route (again switch and link) is the primary route and which is the alternate route. Both the primary and alternate switches transmit the information of the end device to the HLR 318. The alternate switch may obtain information about the primary switch from HLR 318, from the primary switch, or this information may be preconfigured within the alternate switch so that the primary and alternate switches are already paired.

Figure 4:
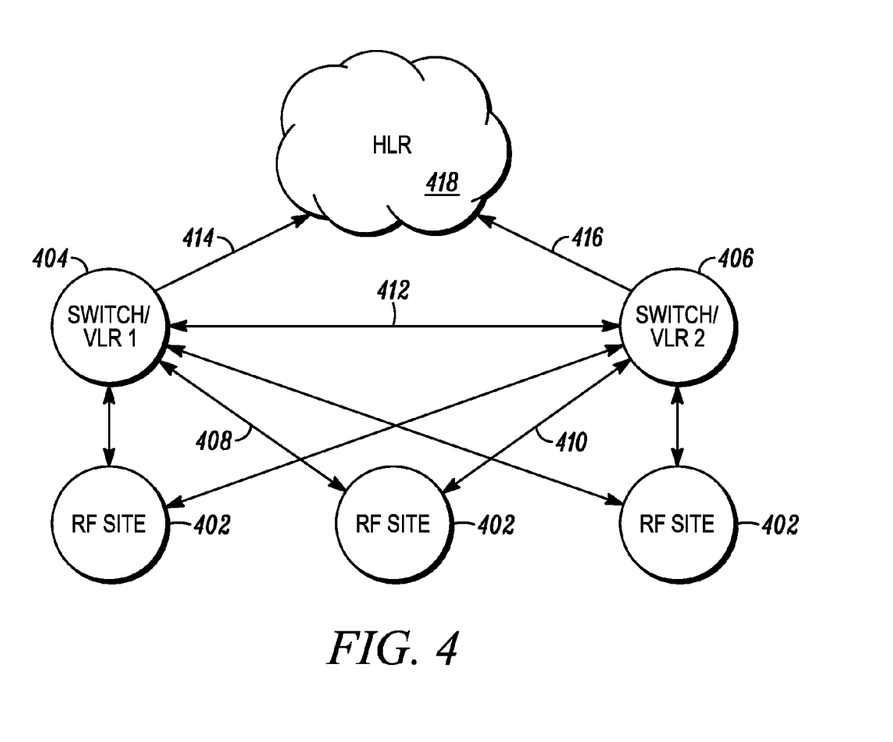
FIG. 4 is another embodiment of data passing between devices in the system of FIG. 1.

Another embodiment is shown in the arrangement of FIG. 4. In FIG. 4, multiple RF sites 402, each of which is connected to switches 404, 406 over links 408, 410. Again, although only two switches are shown in FIG. 4 for convenience, more may be present. Switches 404, 406 are in different geographical locations and cover end devices in the same geographical location. Switches 404, 406 operate in the same manner as switches 304, 306 for each of the RF sites 402, communicating with each other via link 412 and with the HLR 418 over links 414, 416.

In embodiments in which more than two switches are present, as above, generally one of the switches is the primary switch and the others are the alternate switches. Each of the switches is connected directly with the other switches, e.g., through links similar to links 312, 412. These alternate switches may be assigned priorities for taking over as the primary switch if the primary switch becomes non-operational. This prioritization can be based, for example, on a comparison between characteristics of the alternate switch (e.g., memory, processing capacity), characteristics of the links between the switch and the RF sites and/or environmental conditions at the switch with the other switches and links. If no or minimal differences exist between the switches and links, the new primary switch may be chosen randomly or in a predetermined order (e.g., based on which primary switch becomes non-operational), and communicated via any of the links (i.e., directly between the switches or through one of the RF sites). The change of the primary/alternate switch functionality may occur in whole or part if the link between the primary switch and one of the RF sites becomes non-operational; that is, if the link between the primary switch and one of the RF sites becomes non-operational while the links between the primary switch and the other RF sites remain operational, one of the alternate switches can take over primary functionality from the primary switch for just the non-operational link or for all primary switch functions. Obviously, if the link between the alternate switch slated to take over and the same RF site is also non-functional, another alternate switch may take over as the primary switch (if its link to the RF site is operational) independent of any prioritization. Similarly, if multiple links/switches are out, the primary functionality may need to be split between multiple switches and call information coordinated as appropriate.

Figure 5:
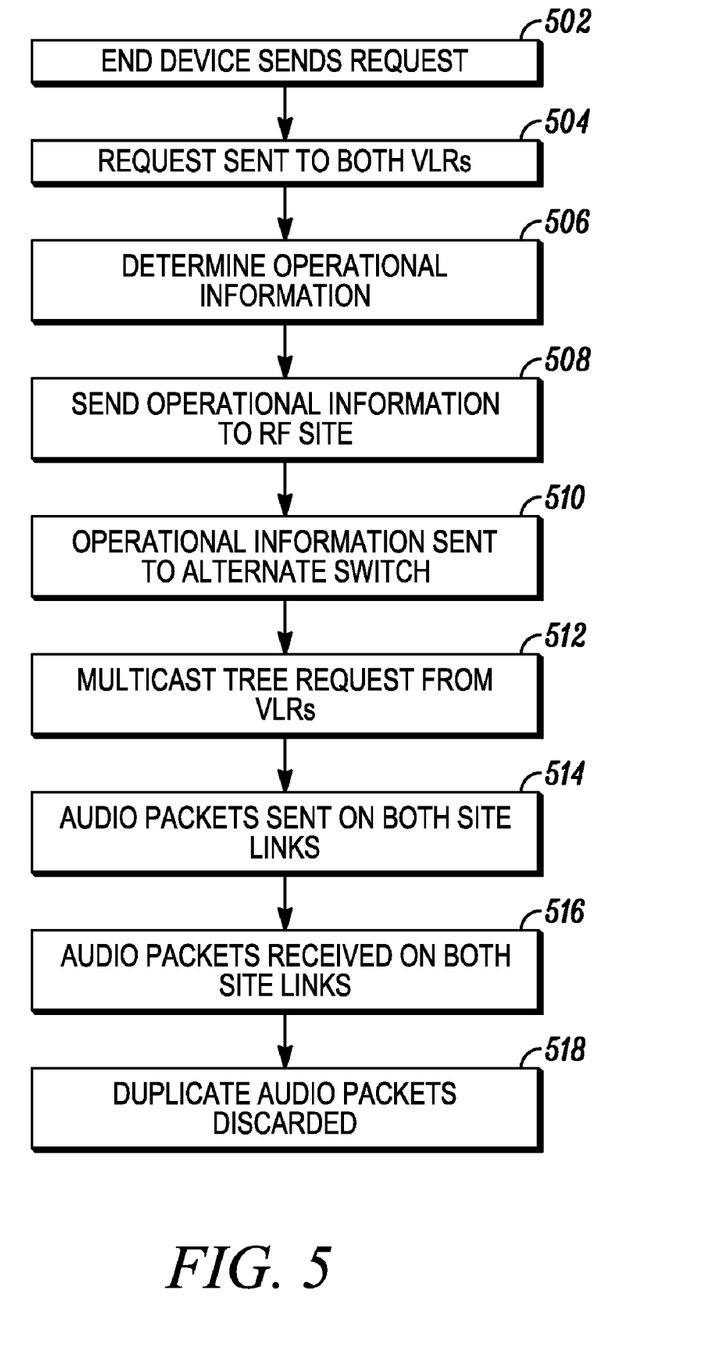
FIG. 5 is an embodiment of a flowchart of a call setup procedure.

After the end device is registered, in one embodiment of a call setup procedure at the source site (audio sourced from the end device attached to this RF site), shown in FIG. 5, the end device initiates the call by sending a request to start a call to the RF site at step 502. At step 504, the RF site sends the request to both the primary and alternate switches. The primary switch determines the operational characteristics, assigning a channel and multicast group to the call in a known manner at step 506. The operational characteristics are then sent by the primary switch to the RF site at step 508 and transmitted through the communication link between the primary and alternate switches at step 510. As above, this communication in one embodiment is initiated by the receipt of the request and subsequent determination of the operational characteristics by the primary switch. The RF site, after receiving the operational characteristics from the primary switch, requests a communication path (e.g., a multicast tree) from both main site link and alternate site link at step 512. This permits the path (e.g., multicast tree) to be established on both links. Audio packets, received over the air from the transmitter by the RF site, are transmitted at step 514 via the communication links from the RF site to the primary and alternate switches. The RF site, making use of the multicast tree information received, sends the packets with the same audio data via the different links with the same unique ID. The targeted audio packets to the end device are received by the respective links at step 516. The audio packets traverse the network from the switches to multicast IP routers and/or other RF sites in the network. The IP routers and/or other RF sites examine the audio packets and discard duplicate packets having the unique ID but different source IP addresses (due to the different routes taken/switches traversed) at step 518. The single audio packet is then eventually delivered to each receiver.

There are a number of different failure mechanisms that may exist; failure of either switch or of either communication link between a switch and the RF site. If the primary communication link fails during a call, the alternate switch determines this as it receives an audio packet without being sent a communication regarding the audio packet from the primary switch within a predetermined amount of time. After the predetermined amount of time, and thus detection of the primary link failure, (the alternate switch takes over control of the RF site without degradation or loss of communication to the RF site). The previous alternate communication link is established as the new primary communication link and the alternate switch is established as the new primary switch. As the audio packets from the transmitter have already been sent to the new primary switch through the new primary communication link, there is no gap in the audio received at the receiver.

After the broken original primary communication link is restored and the restoration detected, this restoration is communicated to the switch whose communication link was not broken (e.g., the current/new primary switch) without ongoing calls being affected. As the original primary communication link was incapacitated, control of the switches may remain with the current primary switch or may seamlessly revert back to the original primary switch. When the original primary communication link is restored, the operational characteristics of ongoing calls (either all calls or only those initiated after failure of the original primary communication link—in either case from the RF site to the switch or from the switch to the RF site) are communicated from the current primary switch once the current primary switch determines that service to the original primary switch is restored.

In a similar manner, if the alternate communication link fails, the primary switch determines this as, for example, it does not receive confirmation from the alternate switch regarding the newly received audio packet within the predetermined amount of time in a response from the alternate switch. As the audio packets from the transmitter have already been sent to the primary switch through the primary communication link, there is no gap in the audio received at the receiver. After the alternate communication link is restored and the restoration detected, this restoration is communicated to the primary switch without ongoing calls being affected. When the alternate communication link is restored, the operational characteristics of ongoing calls are communicated from the primary switch once the primary switch determines that service to the alternate switch is restored.

If the primary switch fails during a call, the alternate switch determines this as it receives an audio packet without being sent a communication regarding the audio packet from the primary switch or any other update/request within a set amount of time dependent on the type of communication. After this time, and thus detection of the primary switch failure, (the alternate switch takes over control of the RF site without degradation or loss of communication to the RF site). The previous alternate communication link is established as the new primary communication link and the alternate switch is established as the new primary switch. As the audio packets from the transmitter have already been sent to the new primary switch through the new primary communication link, there is no gap in the audio received at the receiver.

After the broken original primary switch is restored and the restoration detected, this restoration is communicated to the current/new primary switch without ongoing calls being affected. As the original primary switch was incapacitated, control of the switches may remain with the current primary switch or may seamlessly revert back to the original primary switch. When the original primary switch is restored, the operational characteristics of the ongoing calls are communicated from the current primary switch once the current primary switch determines that service to the original primary switch is restored.

If the alternate switch fails during a call, the primary switch determines this as it does not receive a response from the alternate switch for any communication within the set amount of time. As the audio packets from the transmitter have already been sent to the primary switch through the primary communication link, there is no gap in the audio received at the receiver.

After the broken alternate switch is restored and the restoration detected, this restoration is communicated to the primary switch without ongoing calls being affected. When the alternate switch is restored, the operational characteristics of the ongoing calls are communicated from the alternate switch once the primary switch determines that service to the alternate switch is restored.

Finally, if the communication link between the primary and alternate switches fails, the primary switch continues to process all calls. At least one of the primary and alternate switches indicates to all RF sites to which it is connected (which may be substantial) that the communication link between the primary and alternate switches is non-operational. This enables the primary and alternate switches to communicate indirectly via the RF sites about their current operational status and take appropriate action. In one embodiment, this communication is included in existing signaling between the switches and the RF sites. The RF sites then relay the information that each switch (and corresponding communication link) to the other switch, perhaps through the above existing signaling. This permits the primary switch to communicate with the alternate switch so that the alternate switch does not take over call control, as in the case when the primary communication link or switch fails.

In one embodiment, the signaling from the switch to the RF site includes a bit that indicates which switch is the primary switch and which switch is the alternate switch. For example, the current switch mode bit may be set to 0 if the signaling switch is operating as the alternate switch and 1 if the signaling switch is operating as the primary switch. The signaling from the RF site to the switch includes a bit that indicates whether or not the connection to the other switch is operational or non-operational. For example, the current switch connectivity as seen from the RF site point of view may be provided by a bit set to 0 if the connection to other switch is non-operational and 1 if the connection to other switch is operational.

Although the above embodiments have primarily been directed to multicast messages transmitted from the RF site to the switches, the above redundancy can also be applied when unicast messages are transmitted from the RF sites.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for providing communication redundancy in a mobile communication system, the method comprising:
    forwarding, by a radio frequency (RF) site in the mobile communication system, a request to start a call to at least two different switches, each switch associated with a separate respective Visitor Location Register (VLR), wherein a primary switch of the at least two different switches determines operational characteristics for establishing and maintaining the call and further sends the determined operational characteristics to the RF site and an alternate switch of the at least two different switches;
    the RF site substantially simultaneously transmitting, using the determined operational characteristics, packets having at least one of the same audio or control data, during the call, to the at least two different switches through different communication links.

2. The method of claim 1, further comprising each of the at least two different switches updating a home location register (HLR) based on the data.

3. The method of claim 1, wherein the at least two different switches are both active at the same time and, if multiple RF sites are associated with the at least two different switches, serve the multiple RF sites.

4. The method of claim 1, wherein the packets having at least one of the same audio or control data have different origination addresses, the method further comprising filtering the packets such that only one of the packets is accepted by each respective switch.

5. The method of claim 4, wherein the packets from the RF site have a same unique ID contained therein, the method further comprising eliminating duplicate packets having different origination addresses but the same unique ID and data, and forwarding only the non-eliminated packets to a receiving end device for which the packets were intended.

6. The method of claim 1, wherein the packets are multicast packets.

7. The method of claim 1, wherein the primary switch indicates to the alternate switch, through a switch communication link between the primary and alternate switches, which operating characteristics to use for establishing and maintaining the call in case of a failure in the primary switch or in a primary communication link between the RF site and the primary switch.

8. The method of claim 7, wherein the operating characteristics are transmitted over the switch communication link within a predetermined amount of time from when the request to start a new call is received by the primary switch.

9. The method of claim 7, further comprising the alternate switch establishing itself as a current primary switch to replace the primary switch when the alternate switch detects that a failure exists in the primary switch or in the primary communication link between the RF site and the primary switch.

10. The method of claim 9, further comprising the alternate switch detecting that the failure exists in the primary switch or in the primary communication link between the RF site and the primary switch during a call from an end device transmitted through the RF site by receiving audio packets of the call from the RF site without receiving a communication related to the audio packets from the primary switch.

11. The method of claim 9, further comprising after the failure is restored and the alternate switch detects the restoration, determining whether the alternate switch is to remain the current primary switch and the primary switch is to become a current alternate switch or whether the alternate switch is to revert back to being part of an alternate route and the primary switch is to revert back to being in control of the alternate switch.

12. The method of claim 7, further comprising the primary switch detecting that a failure exists in the alternate switch or in an alternate communication link between the RF site and the alternate switch based on the primary switch not receiving a confirmation within a predetermined amount of time from the alternate switch that the alternate switch has received the same packets received by the primary switch.

13. The method of claim 7, further comprising the primary switch detecting that a failure exists in an alternate communication link between the RF site and the alternate switch based on the primary switch not receiving a response within a predetermined amount of time from the alternate switch to a query from the primary switch, that the alternate switch has received the same packets received by the primary switch.

14. The method of claim 7, further comprising:
    detecting that a failure exists in the switch communication link;
    indicating to the RF site that the switch communication link is non-operational; and
    relaying information between the primary and alternative switches through the RF site.

15. The method of claim 14, wherein the information is relayed using existing continuous signaling between each of the primary and alternative switches and the RF site.

16. The method of claim 14, wherein the information includes different bits, in data being transmitted between a particular switch and the RF site one bit indicating whether the particular switch is operating as the primary switch or as the alternate switch and another bit indicating whether or not the communication link between the RF site and the other switch in communication with the RF site is operational or non-operational.

17. A mobile communication system comprising:
a radio frequency (RF) site configured to receive a request to start a call from an end device;
primary and alternate switches serving overlapping geographical locations and the same RF site, wherein the primary and alternate switches are configured to receive the request to start the call from the RF site, and further wherein the primary switch is configured to determine operational characteristics for establishing and maintaining the call; and
primary, alternate, and switch communication links respectively between the primary switch and the RF site, the alternate switch and the RF site, and the primary and alternate switches, the primary switch being further configured to use the switch communication link to indicate to the alternate switch which operating characteristics to use for establishing and maintaining the call in case of a failure in the primary switch, the primary and alternate switches being further configured to receive packets having at least one of the same audio or control data during the call, the packets being substantially simultaneously transmitted to the primary and alternate switches from the RF site.

18. A communication system of claim 17, wherein the packets having at least one of the same audio or control data have different origination addresses, the primary and alternate switches filtering the packets such that only one of the packets is accepted by each respective switch.

19. The communication system of claim 17, further comprising a router through which the packets pass from the RF site, the packets having a same unique ID, the router configured to discard duplicate packets having different origination addresses but the same unique ID and data such that only one of the packets is transmitted to a receiving end device for which the packets were intended.

20. The communication system of claim 17, wherein the alternate switch is configured to establish itself as a current primary switch to replace the primary switch when the alternate switch detects that a failure exists in the primary switch or in the primary communication link between the RF site and the primary switch.

* * * * *